US011128745B1

(12) United States Patent
Mullen

(10) Patent No.: US 11,128,745 B1
(45) Date of Patent: Sep. 21, 2021

(54) SYSTEMS AND METHODS FOR CELLULAR AND LANDLINE TEXT-TO-AUDIO AND AUDIO-TO-TEXT CONVERSION

(76) Inventor: Jeffrey D. Mullen, New York, NY (US)

( * ) Notice: Subject to any disclaimer, the term of this patent is extended or adjusted under 35 U.S.C. 154(b) by 0 days.

(21) Appl. No.: 11/691,874

(22) Filed: Mar. 27, 2007

Related U.S. Application Data

(60) Provisional application No. 60/786,146, filed on Mar. 27, 2006.

(51) Int. Cl.
*H04M 1/247* (2021.01)

(52) U.S. Cl.
CPC .................. *H04M 1/2478* (2013.01)

(58) Field of Classification Search
CPC .............. H04M 1/0214; H04M 1/724; H04M 1/72403; H04M 2250/12; H04W 88/02
USPC ...... 455/424, 425, 456.5, 456.6, 561, 550.1, 455/575.1, 412.1, 412.2, 413, 415, 563; 704/260, 231, 235, 275, 246; 379/88.01, 379/88.11, 67.1, 88.12, 88.18, 88.19
See application file for complete search history.

(56) References Cited

U.S. PATENT DOCUMENTS

| | | | |
|---|---|---|---|
| 6,094,587 A * | 7/2000 | Armanto et al. | 455/567 |
| 6,314,306 B1 * | 11/2001 | Harris | 455/566 |
| 6,415,258 B1 * | 7/2002 | Reynar et al. | 704/275 |
| 6,775,651 B1 * | 8/2004 | Lewis et al. | 704/235 |
| 7,373,141 B2 * | 5/2008 | Kwon | 455/414.4 |
| 7,496,352 B2 * | 2/2009 | Kaminsky et al. | 455/412.2 |
| 7,590,534 B2 * | 9/2009 | Vatland | 704/235 |
| 7,965,822 B2 * | 6/2011 | Korah et al. | 379/88.03 |
| 2001/0012336 A1 * | 8/2001 | Joyce et al. | 379/67.1 |
| 2001/0034225 A1 * | 10/2001 | Gupte et al. | 455/412 |
| 2002/0090935 A1 * | 7/2002 | Anzai | 455/412 |
| 2003/0050778 A1 * | 3/2003 | Nguyen et al. | 704/235 |
| 2003/0081739 A1 * | 5/2003 | Hikishima | 379/88.01 |
| 2003/0097262 A1 * | 5/2003 | Nelson | 704/235 |
| 2003/0157968 A1 * | 8/2003 | Boman et al. | 455/563 |
| 2004/0199534 A1 * | 10/2004 | Juszkiewicz | 707/101 |
| 2005/0192061 A1 * | 9/2005 | May et al. | 455/563 |
| 2005/0240406 A1 * | 10/2005 | Carroll | 704/235 |
| 2006/0088281 A1 * | 4/2006 | Hasegawa | 386/46 |
| 2006/0224386 A1 * | 10/2006 | Ikegami | 704/260 |
| 2006/0276210 A1 * | 12/2006 | Thomas et al. | 455/466 |
| 2006/0282265 A1 * | 12/2006 | Grobman et al. | 704/246 |
| 2006/0287854 A1 * | 12/2006 | Smolenski et al. | 704/231 |
| 2007/0027691 A1 * | 2/2007 | Brenner et al. | 704/260 |
| 2007/0208563 A1 * | 9/2007 | Rothschild | 704/235 |
| 2007/0260456 A1 * | 11/2007 | Proux et al. | 704/235 |
| 2008/0106047 A1 * | 5/2008 | Snyder | 279/133 |
| 2008/0233926 A1 * | 9/2008 | Eason et al. | 455/414.1 |

FOREIGN PATENT DOCUMENTS

JP 2000-236579 * 8/2000 ............... H04Q 7/38

* cited by examiner

*Primary Examiner* — Ankur Jain

(57) ABSTRACT

Systems and methods are provided for text-to-speech and speech-to-text conversion in wireless devices such as wireless telephones, remote facilities, and land-based devices such as land-line telephones. A wireless telephone, such as a personal cellular telephone, is provided that converts audio data such as a voice message into text data such that a user can view the contents of the voice message as text on the user's wireless telephone.

20 Claims, 8 Drawing Sheets

425

CONVERSION OPTIONS

430 — 1) CONVERT VOICE-MESSAGE TO TEXT
431 — ☒ convert all outgoing voice messages to text and send text in addition to sending voice
432 — Go convert selected audio file to text
433 — ☒ convert all incoming voice messages
434 — Go convert select incoming voice messages
435 — Go Auto-forward converted file to email or other
436 — Go Other options 440 — 2) CONVERT TEXT TO VOICE FILE
441 — Go draft text message, convert to audio, and send audio to a destination (e.g. a phone number)
442 — Go convert text to audio
443 — Go other options

451 — BACK     452 — MORE

475

476 — RELOAD   477 — REFRESH   478 — http://www.email.com

CONVERT TEXT TO VOICE

480 — 1) Convert SMS Message to voice
481 — Go Send Message to Phone Number
482 — Go Forward Audio File in an Email
483 — ☒ Auto convert all text messages
484 — Go Auto forward all converted text messages
485 — 2) Convert email, or other text, to voice.
486 — Go Enter in text and convert the entered text
490 — 3) Voice Options
491 — Go Voice (man, woman, computer voice)
492 — Go Set pitch, tone, and volume
493 — Go Add voice introduction
494 — Go Add introduction to all (e.g., this is a voice rendering of text received by ....)
495 — Go Add introduction dependent on type of text (e..g, this was a text message sent by Susan Pracht)
496 — Go Select file type (.mp3, .wav)

COVERT VOICE TO TEXT 530 1) CONVERT VOICE TO TEXT
531 ☒ Display % converted in text
532 ☒ Display accuracy estimate of converted text in text
533 ☒ Do not mark voice messages as being read if converted.
534 ☒ Mark voice messages as being read if converted.
535 <u>Go</u> Auto forwarding options.
536 <u>Go</u> Intelligent forwarding options.
537 ☒ Forward all voice messages to work email if any number categorized as work calls during hours of 8pm-5pm.
538 ☒ Send text to cell phone
539 ☒ Save text on webpage and send a link
540 ☒ Add introduction to text
541 <u>Go</u> Define introduction

575

CONFIGURE LAND LINE 581 1) Save all voice messages to server as text
582 2) Save all voice conversations to server as text
583 3) Convert all voice messages to text and save as text
584 4) Convert all conversations to text and save as text
585 5) Routing options (e.g., send copies of all text to email(s))
586 6) Define introductions (e.g., date, time, and participants to call)
587 7) Set-up conversion macros
588 8) Do/Do not mark converted messages as Read

SYSTEMS AND METHODS FOR CELLULAR AND LANDLINE TEXT-TO-AUDIO AND AUDIO-TO-TEXT CONVERSION

CROSS-REFERENCE TO RELATED APPLICATION

This application claims the benefit of provisional Patent Application No. 60/786,146, filed on Mar. 27, 2006, titled "SYSTEMS AND METHODS FOR CELLULAR AND LANDLINE TEXT-TO-AUDIO AND AUDIO-TO-TEXT CONVERSION," which is hereby incorporated by reference herein in its entirety.

BACKGROUND OF THE INVENTION

This application relates to text-to-speech and speech-to-text conversion.

Current wireless telephone users can only check voice messages by physically holding the wireless telephone to their ear and listening to the entirety of the message at the speed that the message was recorded. As such, users can only check voice messages of wireless telephones when they have the time, and privacy, to listen to a wireless telephone's audio speaker. It is therefore desirable to allow a user to receive the contents and subject matter of a voice message without having to listen to the voice message.

Current wireless telephones have numerous types of communication schemes. One such communication scheme is text messaging where text messages can be sent from one wireless telephone to a different wireless telephone. Such text messages are deficient because text messages can only be received by wireless telephones operable to receive text data. It is therefore desirable to allow the contents of a text message to be received by a wireless telephone not operable to display text.

SUMMARY OF THE INVENTION

Systems and methods are provided for text-to-speech and speech-to-text conversion in wireless devices such as wireless telephones, remote facilities (e.g., wireless telephone service providers or other service providers), and land-based devices such as land-line telephones.

A wireless telephone, such as a personal cellular telephone, is provided that converts audio data, such as a voice message, into text data such that a user can view the contents of the voice message as text on the user's wireless telephone. The conversion process can be automatically performed such that a user can determine, for example, either to listen to the voice message as audio data or read the already converted audio message as text data. A user may, for example, be provided with a graphical user interface for converting audio data (e.g., a voice message such as a voicemail) into text data (e.g., a text message such as an SMS text message).

A user may setup the wireless telephone, or prompt the wireless telephone, to send copies of the converted text data to a particular email address/addresses or other device/devices (e.g., another wireless telephone or a remote server). In this manner, a user can, for example, direct a wireless telephone to automatically convert new voice messages into text and send a copy of the text to one or more email addresses. Similarly, a user can convert a voice conversation the user is having with a different user into text and send a copy of this text to any device (e.g., a personal computer via an email address). Conversion of a conversation into text (e.g., to provide a transcript of the conversation) can be performed in real-time while the conversation is occurring. Alternatively, a conversation can be recorded on a memory device of the wireless telephone (e.g., via a record conversation button) and converted at a different time. Alternatively still, a conversation can be recorded by a remote server such as a remote server associated with a facility facilitating the wireless conversation (e.g., via manual input in the form of a record conversation remotely button) and converted at another time or in real-time. Any wireless conversation can be recorded such as, for example, a wireless conversation over a cellular network or radio channel. A voice conversation between users of any number of devices may be converted. For example, a conversation between the users of two landline telephones, a landline telephone and a wireless telephone, or any number of telephones (e.g., more than two wireless and/or landline telephones) may be stored and converted into text.

When audio is converted into text, for example, additional data may be inserted into the text (e.g., a transcript). Such additional data may include, for example, an identifier to distinguish audio data provided by different users. For example, a conversion tool may distinguish speech from different people and add an identifier whenever speech transitions from one person to the other (e.g., when a telephone stops sending speech data and starts receiving speech data). Such an identifier may take the form of, for example, a wireless telephone number or a user name. An identifier in the form of a name may be a person's name, associated with a particular telephone number, that is stored in a cell phone (e.g., inputted by the user of that cell phone). Conversation transcripts may be, for example, generated at the device of one conversation participant and sent to all participants or generated at a remote facility and sent to one or more (e.g., all) participants. Additional data may be included in the converted data and may be dependent on the receiving participant such that the additional data (e.g., a participant identifier) may be different in each participant's transcript.

A dictation option may be provided (e.g., via a dictation button) that allows a user to speak into a microphone on the wireless telephone such that the wireless telephone can convert the audio data into text and save the text data to memory as text message data (e.g., SMS data) or email data (e.g., HTML based email data) or any type of text data. A conversion button may be provided on a telephone that records/converts dictation when a phone is not engaged in a call and records/converts a conversation when the phone is engaged in a call.

Any of the conversion features may be provided on a remote facility. Such a remote facility may include a server with multiple gigabytes or terabytes of memory (e.g., more than one terabyte of memory) and may be utilized by multiple users. A user may manually initiate the download of text data (e.g., one or more text message) or audio data (e.g., one or more voice messages) to the user's device (e.g., a wireless telephone) or may initiate an upload of text data or audio data to the remote facility. Data may be downloaded and/or uploaded periodically or based on events. Events may include, for example, when new data is received (e.g., a new voice message is received at a remote facility), when a wireless telephone turns ON, or when the telephone is operable to receive/upload data (e.g., when a data transfer or a telephone call to a wireless device ceases). Accordingly, one or more (e.g., all) of the voice messages and/or text messages may be downloaded to a wireless telephone at an event (e.g., when the wireless telephone turns ON) and may be converted either automatically or manually at the wireless telephone.

A remote facility may provide remote conversion, retrieval, and transmission of, for example, audio or text data. For example, the remote facility may receive a request from a wireless telephone (or land-based, non-wireless telephone or other device such as a video game console) to convert a received voice message to text and send the voice message as text to a particular location (e.g., another wireless device or the requesting wireless device). Alternatively, the remote facility may receive a request from a wireless telephone (or land-based, non-wireless telephone or other device) to convert a received text message into speech representative of the text and send the speech data to a non-wireless telephone as audio (e.g., a land-line telephone incapable of receiving text messages) or the requesting wireless telephone. Remote conversion may be advantageous in systems that do not include conversion tools but that include the capability to receive a particular type of data. For example, one generation of a video game system without an audio conversation capability (e.g., sending/receiving voice data during the video game) but that includes a instant messaging capability (e.g., sending/receiving text data) can receive audio messages, in the form of audio-converted text, from a user of another generation of a video game console utilizing an audio conversation capability.

Users of a device can turn any conversion features OFF (and ON) for any user or allow conversion to be controlled by select users. As such, a level of security is added and a user does not receive a large number of text messages or voice messages. For example, a user can turn OFF a feature that allows a remote facility to convert data and send the data to a different user's wireless device. As such, unauthorized users may, for example, not use the remote facility to convert data and/or transmit converted data for a particular user's device. For example, for a conversation to be transcribed, both parties may need to authorize that the other party can receive converted data. Thus, for example, a participant of a telephone call may need to obtain the permission of the other participant(s) before the audio associated to those participant(s) can be converted into another form of data (e.g., text data). Participants may provide permissions at any time and may provide such permissions on a remote service. Accordingly, a user may store permissions on a remote server indicative of permission to allow a number (e.g., 10) of that user's friends to convert all of his audio data or a particular type of audio data (e.g., voicemails and/or conversations). Additionally, a user that sends data (e.g., a voice message) can provide instructions that the data cannot be converted into another form (e.g., into text).

A land-line telephone is provided that includes conversion features and/or that is operable to connect to, and direct, a remote facility (e.g., a remote server) to provide conversion features. As such, voice data representative of speech can be entered by a user on a landline telephone, converted into text, and sent to a wireless telephone capable of receiving text (e.g., a text message). As such, a landline telephone may be provided with a text messaging or instant messaging capability.

Conversion tools can also be provided, for example, with email systems or any system capable of receiving text. As such, an email can be sent to a telephone, or any device with a speaker such as a personal music/entertainment/game player with a communications port, but be received as audio that can be played through the receiving device's speaker. Such conversion features can occur at the email system (e.g., on a personal computer or wireless telephone) or at remote facility (e.g., a remote server), both, or another device. For example, the email can be converted into audio at a remote facility and provided to the device that includes a speaker (e.g., with or without the associated email). Similarly, a telephone call can be placed to an email address and the voice data supplied to the microphone of the telephone can be converted to text and sent to the email address. The conversion of the audio to text can occur anywhere such as, for example, the device providing the telephone call, a remote facility (e.g., a server associated with the telephone service or the email service), or the receiving email device. Such a receiving device may receive an email that includes (e.g., is associated with) an audio file and may convert that audio file into text (e.g., an email). The receiving device may detect that conversion is desired in numerous ways such as, for example, by the extension of the audio file, data included in the email (e.g., such as the sending email address), or other identifier.

Multiple voice options and text options can be provided in a conversion tool. For example, a voice can be selected from multiple voices (e.g., by the receiving user, transmitting user, administrator, or all) for text-to-audio conversion. Alternatively, pitch, tone, and volume options may be provided such that a user can make a unique voice for text-to-audio conversion. A user can adjust the speed at which the audio is played-back so as to reduce the time needed to listen to the audio. A user can record (e.g., on a remote facility) the user's voice in multiple situations (e.g., saying multiple words) so that a voice representative of the user's voice is used in text-to-audio conversion. A virtual user voice can be generated by stringing together characters or words recorded in the user's voice. A virtual user voice can be generated by matching pitch and tone changes for particular words with pitch and tone changes recorded for the user.

Additional data, such as message headings, can be provided before a voice message, text message, or any other data which utilizes conversion features. For example, a text message provided by a conversion from audio data to text data can include a header that includes a message representative that conversion occurred as well as who left the original message and the time the original message was left. Similarly, audio data converted from text data can include a spoken header that includes speech data representative of, for example, the fact that conversion occurred, the voice of the message is virtual and not real, the name of the person leaving the text data that was converted, the time the person left the text data, the method by which the text data was transmitted (e.g., a text message or email), and/or the name of the company providing the conversion/routing service. Providing a remote facility allows for an information brokering scheme to be provided such that a user can log-into the remote facility by any device (e.g., a personal computer) and check data not operable to be received by that device or data in a form that is undesirable to the user, but that was received by a different device of the user (e.g., the user's wireless telephone) or a different user's device.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIG. 4 is a graphical user interfaces for conversion features constructed in accordance with the principles of the present invention;

FIG. 5 is a graphical user interface for conversion features constructed in accordance with the principles of the present invention;

DETAILED DESCRIPTION OF THE DRAWINGS

Figure 1:
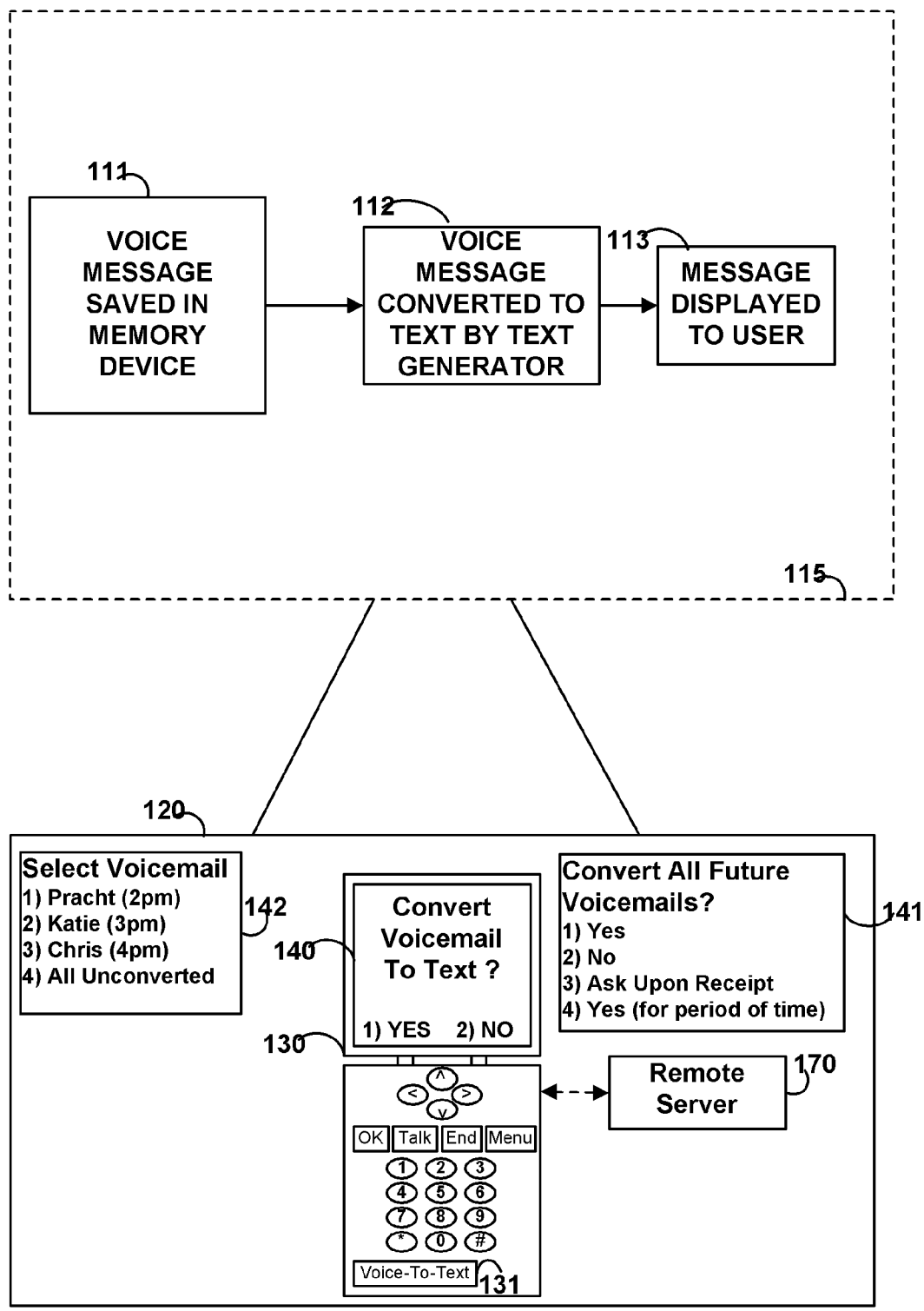
FIG. 1 is an illustration of a wireless device with conversion features constructed in accordance with the principles of the present invention.

FIG. 1 shows conversion topology 110 that includes process 115 and wireless telephone options 120. Conversion process 110 may include, for example, retrieving a voice message saved in memory of any type of device (e.g., a wireless telephone or portable video game system) in step 111, converting the audio message into text in step 112, and displaying the text message in step 113. The text message may be stored to memory, for example, before the message is displayed to a user. The voice message that was converted can be, for example, automatically erased after conversion, or manually erased anytime. The automatic erasure of a file after conversion can be manually set by a user or, for example, may be a permanent or temporary default setting. Such an erasure may be beneficial in, for example, portable wireless devices where memory is limited. A user (e.g., the sending user or the receiving user) may determine parameters for the conversion. For example, a user recording a voicemail to a server may designate that if the voicemail is converted (e.g., by the recipient) then the text should have a particular form (e.g., font, size, color, formatting). Such parameters may be manually input on the sending user's device (e.g., a portable telephone).

By freeing up memory, the content of a large number of voice messages can be saved in text. For example, a wireless telephone company can keep a copy of every voice message ever received by a user. Similarly, a wireless telephone can keep text copies of a large number voice messages on the wireless telephone for long durations (e.g., over 500 voice messages converted into text such as 1,000 or 10,000 or more converted voice messages). A user can log into a website for a wireless telephone company, view any voice message in text form (or audio form), and provide comments/markers to any voice message so important messages are catalogued/identified. For example, a user can create folders on the user's device or a remote server by utilizing the user's device to organize voice messages. As such, a user can create a folder and provide instructions to place all voice messages, either those converted into text or present in audio audio, into the created folder. The user can name the folder and assign access permissions to the folder.

Numerous conversion and other options, such as options 120, may be included in a device utilizing conversion features. For example, wireless telephone 130 may display graphical user interface 140 to request user input indicative of whether or not a voicemail or other audio data including speech is desired to be converted into text (e.g., a text message or email). The interface may be associated to the possible input combinations of the device's manual input devices such as manual input buttons (e.g., alphanumeric telephone input pad). Similarly, a wireless device may provide a graphical user interface requesting whether or not a user would like to convert text to audio (e.g., an email to audio data representative of speech).

Remote server 170 may communicate with a device having, or utilizing, conversion features such as wireless telephone 130. Remote server 170 may perform any of the conversion and routing features. Remote server 170 may allow conversion to occur, and text/audio to be retrieved or stored, even when a user's wireless telephone is OFF (or lost). For example, a user may log into, and be identified by, a website such that audio (e.g., a voicemail) or text (e.g., a text message) may be downloaded from the website to a device (e.g., a non-portable non-wireless computer). Such functionality may be provided even when the device intended to receive the audio data (e.g., a cell phone) is turned OFF. Such a functionality may utilize a login/password to identify a user associated with the device such that the user can retrieve data associated with the device even when the device is OFF.

Conversion button 131 may be included to, for example, turn all or any conversion feature ON or OFF and/or to automatically convert data from one form to another (e.g., audio including speech into text). Multiple conversion buttons may be included on a device. For example, one conversion button may be associated to the task of converting a text message into a voice message. Another conversion button may be associated to the task of converting a selected voice message into text. As stated above, however, one button may be utilized to perform conversion features such that if a voice message is selected and the button is pressed the voice message is converted to text, while if a text message is selected and the button is pressed the text message is converted into audio. The button could have additional functionalities such as to transcribe a conversation during a call and accept/transcribe dictation.

Persons skilled in the art will appreciate that the conversion process may be utilized in a number of ways to provide additional useful functionalities. For example, a translation feature may be provided that converts audio to text, translates the text into a different (e.g., a desired) language and converts the translated text into speech data. Thus, a user receiving a voice message in a foreign language may request that the voice message be converted into English text and/or English voice. A language database storing words, characters, and/or phrases may be utilized to determine the language that was spoken/written and the associated words, characters, and/or phrases in the desired language. Such functionality may be particularly useful, for example, for people using a wireless telephone in a country where the countries national language is a second language. Thus, wireless telephone users can convert text and/or voice data of one language into text and/or voice data of another language in order to better understand information that was transmitted.

Information representative of translation and/or conversion accuracy may be displayed to a user. For example, a user may be notified that a particular number or percentage of words could not be converted from one data form (e.g., audio) to another data form (e.g., text). Such information would allow a user to determine whether or not the original data should be listened to or read. A threshold may be provided such that converted data is not displayed to a user if a number of words or a particular percentage of the audio message (e.g., the spoken portions of the message) could not be converted. Additionally, accuracy information may be provided indicative of how correct the converted data is believed to be. Furthermore, a user may provide instructions such that only a portion of data (e.g., a percentage or particular amount of time) of data is converted. For example, a user may request that only a particular number of seconds (e.g., 10, 20, 30) of a voice message be transcribed to text. Such a feature may allow, for example, for a user to obtain an idea of the contents of a message (e.g., a voice message) without having to wait until the entire file is converted and without having to utilize an amount of memory needed to store a file (e.g., text) that includes the entire conversion.

Graphical user interface 142 may be provided on a device (e.g., a land-line non-wireless telephone or a wireless telephone) that provides a list of data files (e.g., voicemail files) to be converted. One option may be, for example, to convert all unconverted files of a particular form. For voicemails, the name of the person leaving the voicemail may be provided as well as the time the voicemail was left. Additional information may be provided such as, for example, the time the data was converted and the telephone number of the wireless telephone number leaving the voicemail. A user may provide instructions that the conversion happen at a remote server so only the converted file is provided to the wireless telephone. Alternatively, the user may provide instructions that the conversion occur at the wireless telephone (e.g., whenever a particular type of file such as a voice message is received). Thus, when a particular data is received by a telephone the user can determine how to perceive the data (e.g., via audio or text). Persons skilled in the art will appreciate that text may include any visual indicia and speech converted into text may be represented by indicia associated to the determined speech.

Graphical user interface 141 may be associated with wireless telephone 130 and may be utilized, for example, to provide information, and receive control signals, for converting future data files. For example, graphical user interface 141 may be utilized to request that a user enter information indicative of an intention to have future emails converted indefinitely or a period of time or that the user should be asked for conversion preferences each time a particular type of data file is received (e.g., a voice or text message).

Persons skilled in the art will appreciate that any audio data may be converted. For example, a user may download a song to a wireless device and a speech-to-text conversion may be performed on the wireless device in order to obtain the lyrics for the song. The lyrics may be provided to the user via a graphical user interface and the lyrics may be displayed in manner such that the lyrics sync with the speech in the song as the song is being played (e.g., via horizontal or vertical scrolling). Similarly, the audio data of a video file (e.g., a TV show, movie, or music video) may be converted from speech into text. Such conversion functions may occur at a server providing the media (e.g., ringer, music file, or movie file).

Figure 2:
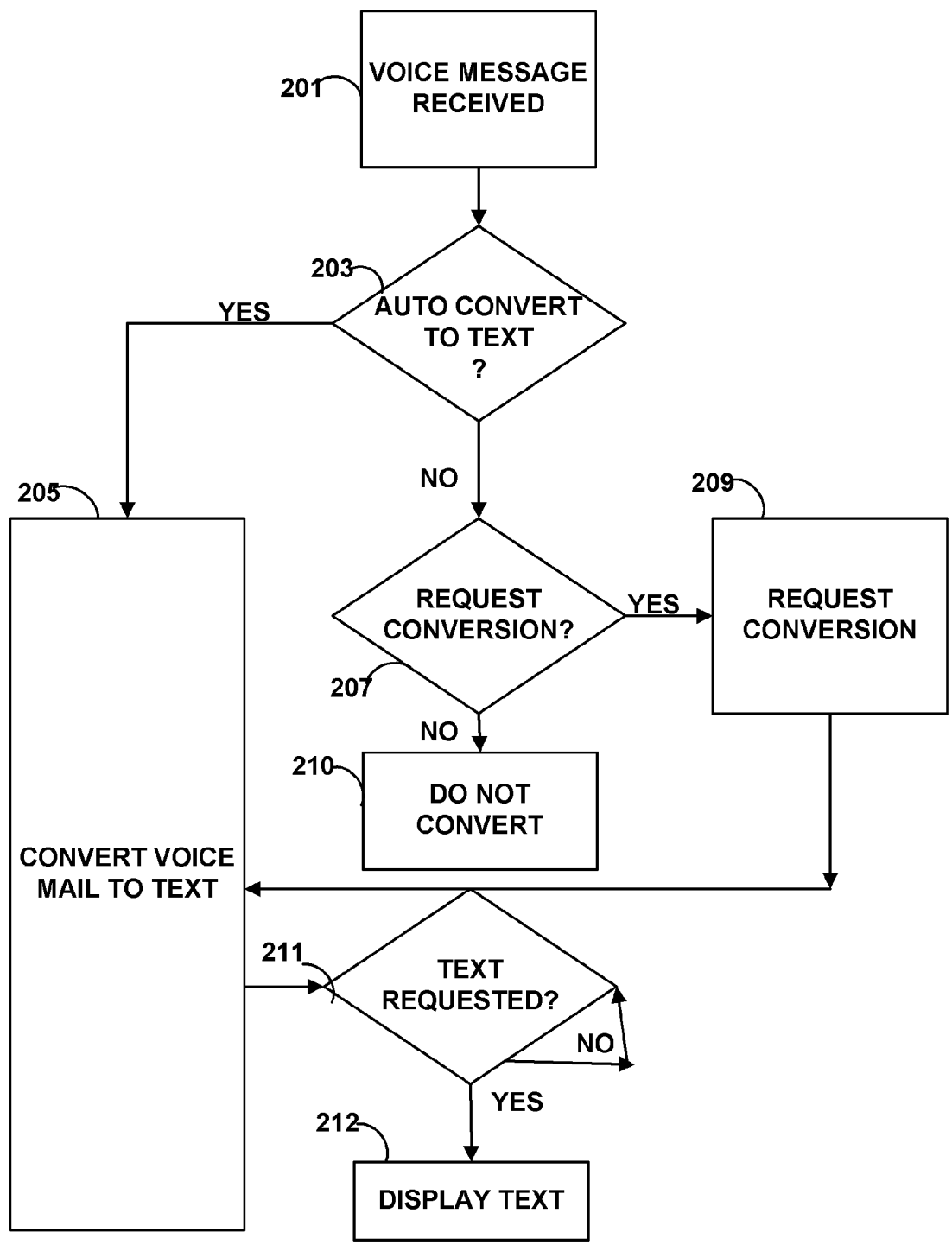
FIG. 2 is an illustration of a conversion process flow chart constructed in accordance with the principles of the present invention.

FIG. 2 shows process 200 that may be utilized to provide conversion features. For example, a voice message may be received in step 201 such as received from a mobile telephone service provider to a wireless telephone that was the intended recipient of the voice message. Step 203 may be included to determine whether or not the voice message is to be automatically converted. Step 203 may be controlled, for example, from user settings provided by the manual input of data from a user. Step 203 may be, for example, permanently or temporarily set at the manufacturers or when a conversion program is first installed (e.g., by the user). Step 203 may be defined and/or changed, at any time, by a user. If the file is to be automatically converted, conversion may occur in step 205. Else, step 207 may be initiated such that a determination may be made as to whether or not a user is asked if conversion is desired. Step 207 may be, for example, included as the result of user preferences entered into a user options graphical user interface.

A user may set up process 200 such that every received one of a particular type of file (e.g., voice message and/or text message) prompts a request for manual input indicative of whether or not conversion is desired for the received file. A user may also provide instructions indicative of converting only particular types of messages (e.g., voicemails) from particular people (e.g., telephone numbers) and/or in particular situations (e.g., if the cell-phone is put on vibrate or instructed that the user in unavailable to listen to voice messages). If step 207 determines that a conversion request is to be sent, then a conversion request may be initiated in step 209 that directs step 205 to perform a conversion. Else, no conversion may occur in step 210. At any time, manual input may be received indicative of a desire to convert or not convert data. The file is converted in form in step 205. If the converted file is supposed to be immediately displayed at the determination at step 211, then the file is displayed at step 212 (e.g., displayed on a display screen if a text message). Persons skilled in the art will appreciate that if, for example, files are automatically converted then the converted file may be stored until a manual request is received to display the file, at which time the file may be retrieved from memory.

Figure 3:
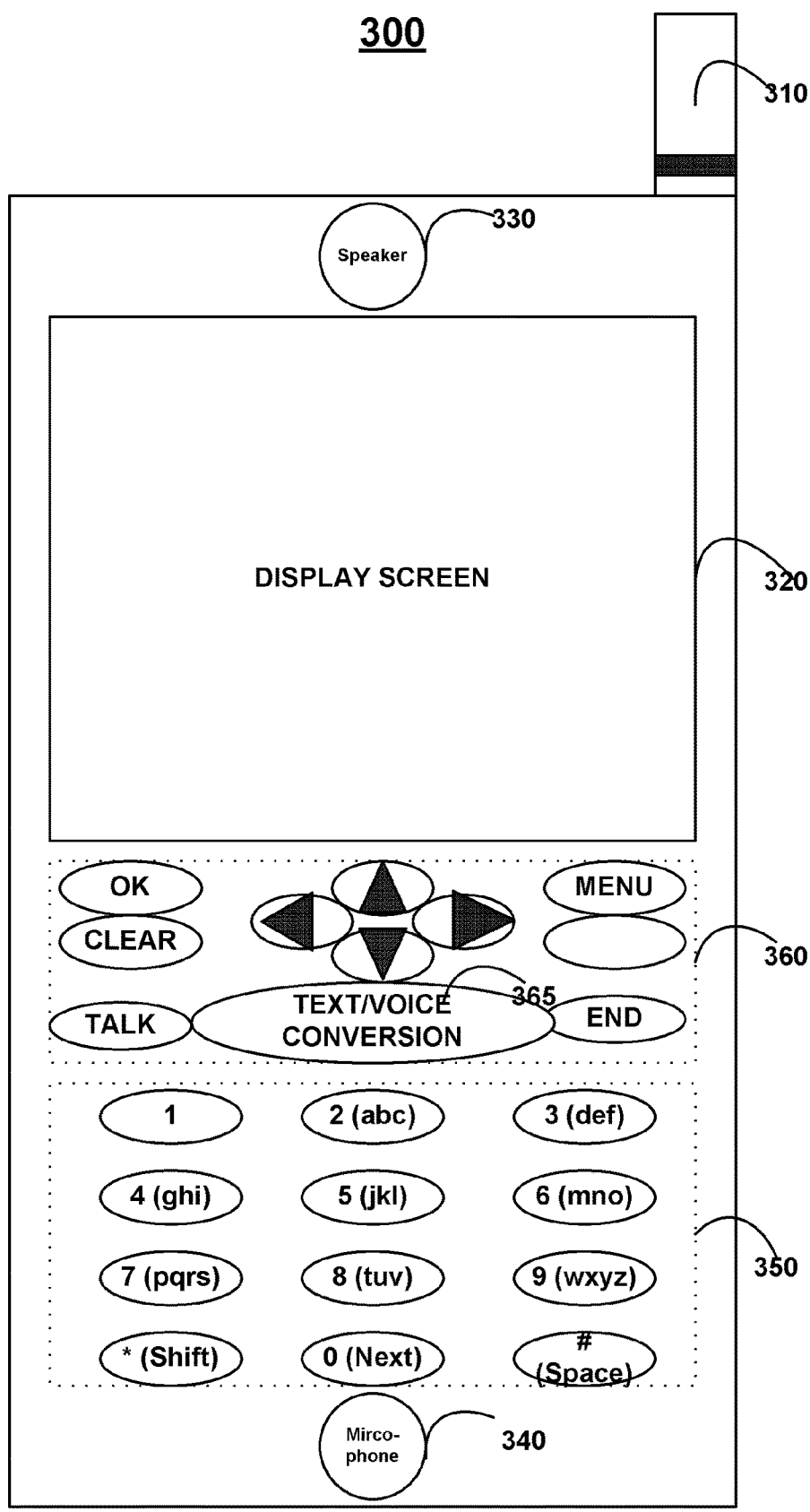
FIG. 3 is an illustration of a wireless telephone constructed in accordance with the principles of the present invention.

FIG. 3 shows wireless telephone 300 that includes a receiver 310 for receiving data such as converted and unconverted audio and text data. Persons skilled in the art will appreciate that text-to-audio conversion may provide a useful method for transmitting a ringer to a user. For example, a caller may manually input a text message before, during, or after a call is made to a particular user. The text message may be associated to the particular user such the text data is always sent at the beginning of any call or the particular call. A remote facility may recognize this text data and may send it to the wireless telephone of the user being called at the call's initiation. The text can then be converted to audio at the wireless telephone such that the wireless telephone rings in a particular manner. Thus, Chris Mullen can call Jeff Mullen and set a ringer, in the form of text, for Jeff Mullen that says "Jeff, its your brother Chris, its an emergency." Then, when Jeff's cell phone first rings, Jeff's cell phone will ring with a virtual voice stating "Jeff, its your brother Chris, its an emergency." A portion of the text, or all of the text, can also be displayed on the user's telephone while the telephone operates the ringer such that both a customized display and a customized audio is provided. Such a scheme allows for information to be transmitted in the form of a ringer without using, for example, any significant amount of bandwidth. Such a ringer may be initially recorded as audio, converted to text, transmitted as text, received as text, converted to audio, and/or played as an audio ringer with a virtual voice either defined by the calling or receiving user. Ringer conversion/generation can occur on any device (e.g. the sending device, routing device such as a remote server, and receiving device).

Display screen 320 and speaker 330 may also be included in wireless telephone 300. Display screen 320 may be utilized, for example, to display video, image, graphical user interfaces, internet browsers, text editors, text messages, instant messages, chat rooms or any type of data. Speaker 330 may be utilized for to play audio such as ringers, music, movies, text converted into audio, or telephonic communications.

Conversion button 365 may be included to convert a file from one form to another. Additional controls 360 and alphanumeric keypad 350 may be included. Microphone 340 may also be include for receiving audio data. Additional components (e.g., processor(s), memory device(s), inertial movement sensors, and positioning systems) may be included in wireless telephone 300.

FIG. 4 shows graphical user interface 425 and graphical user interface 475. Graphical user interface 425 may display options such as to convert a voice message to text (e.g., option 430). Any type of data that, for example, includes speech may be converted. Interface 425 may include options to convert all outgoing voice messages to text and send text in addition to sending voice (e.g., option 431). An option may be provided to convert all incoming voice messages to text and store text in addition to storing voice. Persons skilled in the art will appreciate that text may be displayed in different ways on a display. For example, a text may be displayed in different colors depending on user settings but the text may be stored in the same form in both instances.

Interface 425 may include options to convert a selected audio file to text (e.g., option 432). Interface 425 may include options to convert all incoming messages to text (e.g., option 433). Interface 425 may include options to convert select incoming voice messages (e.g., option 434). Interface 425 may include options to auto-forward converted file to an email or other address (e.g., option 435). Interface 425 may include other options (e.g., option 436) such as manual forwarding of converted data to other destinations (e.g., an email address).

Graphical user interface 425 may also display options such as to convert text to a voice file (e.g., option 440). Interface 425 may include options to draft text messages, covert text to audio, and send audio to a destination such as a land-line or wireless telephone number (e.g., option 441). Interface 425 may include options to covert text to audio (e.g., option 442). Interface 425 may include other options (e.g., option 443) such as setting the amount of text (e.g., percentage or spoken time after conversion) that is to be converted. Navigational tools may be provided such as, for example, virtual back button 451 that can be utilized to return to a previous interface and virtual more button 452 that can be utilized to view another interface.

Graphical user interface 475 may be included on any device. For example, interface 475 may be included on a personal computer as an internet browser, a land-based non-wireless telephone, a wireless telephone, or a video gaming device. Graphical user interface 475 may include navigational tools such as, for example, reload 476, refresh 477, other internet browser functions such as internet address input box 478. Interface 475 may include options to convert text to voice options. Interface 475 may include options to convert SMS message to voice (e.g., option 480). Interface 475 may include options to send a message to a phone number (e.g., option 481). Interface 475 may include options to forward audio file(s) in an email (e.g., option 482). Interface 475 may include options to automatically convert all text messages (e.g., option 483). Interface 475 may include options to automatically forward all converted text messages (e.g., option 484). Interface 475 may include options to convert email or other text to voice (e.g., option 485). Interface 475 may include options to enter in text and convert entered text (e.g., option 486). Interface 475 may include voice options (e.g., option 490). Interface 475 may include voice settings to change the voice between a man, woman, or other virtual voice (e.g., option 491). Interface 475 may include options to set pitch and/or tone and/or volume of virtual voice (e.g., option 492). Interface 475 may include options to add a voice introduction (e.g., option 493). Interface 475 may include options to add an introduction to all data of a particular type such as "this is a virtual voice rendering of text received by . . . " (e.g., option 494). Interface 475 may include options to add an introduction dependent on type of text such as dependent on the sender of the data (e.g., option 495). Such an introduction may take the form of "this was a text message sent by Susan Pracht." Interface 475 may include options for converted file type selection such as .mp3 and/or .wav for converted text provided as audio files (e.g., option 496).

FIG. 5 shows graphical user interface 525 and graphical user interface 575. Graphical user interface 525 may include options such as, for example, converting voice to text (e.g., option 530). Interface 525 may include options to display the percentage of an audio file converted into text (e.g., option 531). Such an option may be indicative of the percentage of a file that should be converted into text (or an amount), the percentage estimate of a file that was able to be converted, or the percentage of the file that was converted and displayed on a particular interface. For example, audio may be converted into text and an interface may display a screen that includes a portion of the converted text. Indicia representative of the amount of text displayed versus the amount of total text (or remaining text) may be, for example, displayed on that interface such that a user is provided with an indication of how long the message is and how much information from the message is being displayed. Interface 525 may include options to display an accuracy estimate of the converted text in text (e.g., option 532). Interface 525 may include options to not mark voice messages as being read if converted (e.g., option 533) or, for example, if the text message from the conversion is read. Interface 525 may include options to mark voice messages as being read if converted (e.g., option 534) or, for example, if the text message from the conversion is read. Interface 525 may include auto-forwarding options (e.g., option 535). Interface 525 may include intelligent forwarding options (e.g., option 536). For example, interface 525 may include options to forward all voice messages to a particular destination (e.g., work email) if any number of calls categorized as particular type of calls (e.g., work calls) occur or occur during a particular period of time (e.g., option 537). Interface 525 may include options to send converted text to a wireless telephone (e.g., option 538) such as the user's telephone or a different telephone. Interface 525 may include options to save text on a webpage and send a link associated with that webpage (e.g., option 539) to the user's telephone, a different telephone, or any particular device or devices. Similarly voice messages, text messages, text obtained from a speech-to-text conversion, and voice obtained from a text-to-speech conversion may be stored and retrieved via the internet on a webpage. Interface 525 may include options to add an introduction to text (e.g., option 540). Interface 525 may include options to define an introduction (e.g., option 541).

Graphical user interface 575 may include options such as land-line telephone configuration options. Interface 575 may include options to save all voice messages to a remote server as text (e.g., option 581). Interface 575 may include options to save all voice conversations to a server as text (e.g., option 582). Interface 575 may include options to convert all voice messages to text and save as text on a device such as a wireless telephone (e.g., option 583). Interface 575 may include options to convert all conversations to text and save as text on a device such as a wireless telephone (e.g., option 584). Interface 575 may include routing options such as sending copies of all text to email address(es) (e.g., option 585) or other devices (e.g., wireless telephones). Interface 575 may include options to define introductions such as date stamps, time stamps, participant stamps (e.g., option 586). Interface 575 may include options to set-up conversation macros (e.g., option 587). Interface 575 may include options to mark/not mark converted messages as being read (e.g., option 588). For example, a user that reads a text message converted from audio may cause the system to display the audio as also being viewed. Interface 575 may include other options such as email conversion options. For a landline telephone, for example, a printer may be connected to the telephone and converted data (e.g., text converted from audio) may be printed out on the printer either automatically or as a result of manual user input. Similarly, a storage device may be provided with the landline for storing audio files such that if text data (e.g., an email) is converted into audio the audio can be stored on the storage device. A printed may also be included in, or may be attached to, a wireless telephone. Similarly, data (e.g., voicemails, text messages, text converted from speech, speech converted from text) may be stored on a removable storage medium that may be inserted into the wireless telephone by a user.

Figure 6:
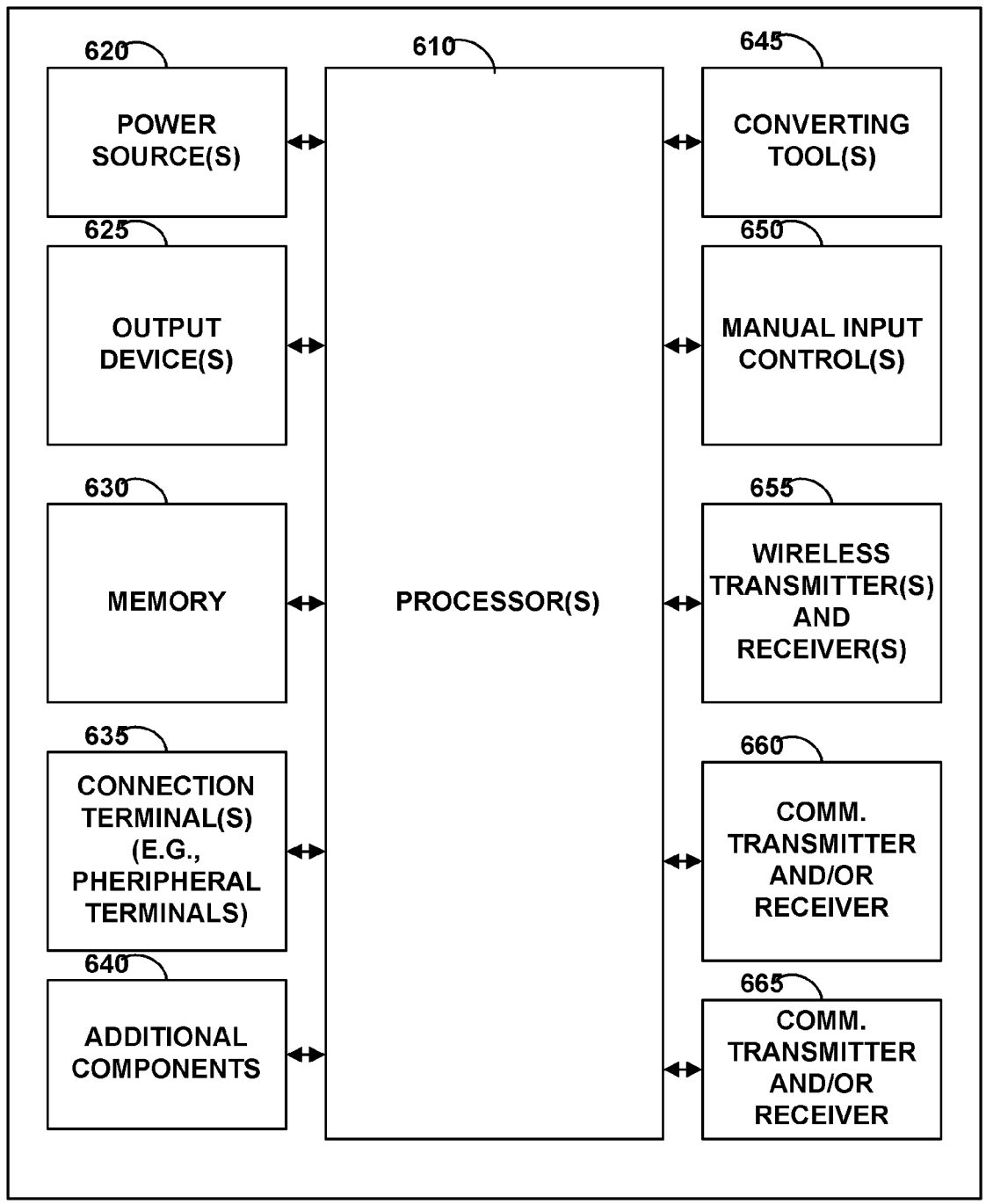
FIG. 6 is a hardware architecture for a device with conversion tools constructed in accordance with the principles of the present invention.

FIG. 6 shows hardware 600 that may include any number of software and/or hardware components. For example, hardware 600 may include power source(s) 620, output device(s) 625, memory device(s) 630, connection terminal(s) such as peripheral terminal(s) 635, additional component(s) 640, converting tool(s) 645, manual input control(s) 650, wireless transmitter(s)/receiver(s) 655, communication transmitter(s)/receiver(s) 660 and 665, and processor(s) 610. Converting tool(s) 645 may be stored on memory 630 as a program and run by processor 610.

Figure 7:
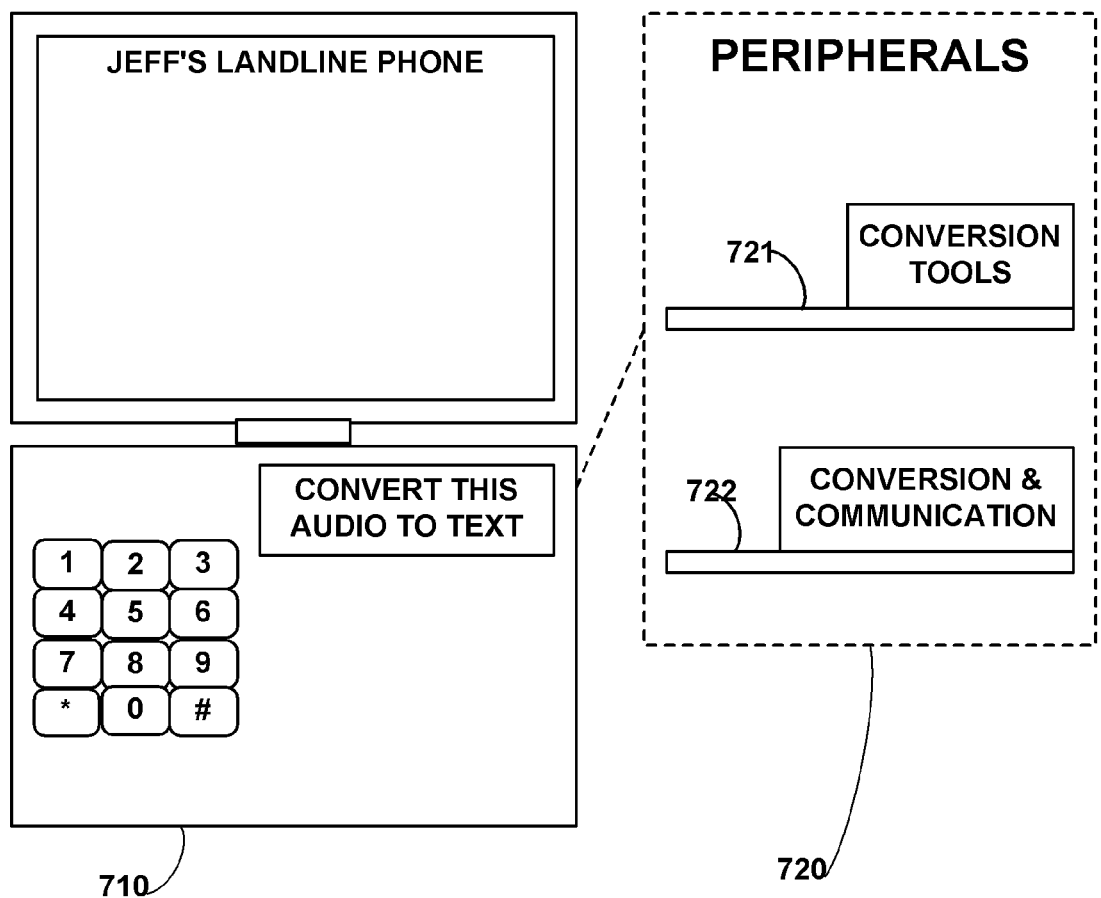
FIG. 7 is an illustration of peripherals with conversion tools constructed in accordance with the principles of the present invention.

FIG. 7 shows topology 700 that may include a landline non-wireless telephone 710 that may include conversion tools, conversion buttons, and/or is operable to communicate with a remote server/facility that includes conversion tools. Peripherals may be included to provide conversion capabilities to devices without conversion capabilities. For example, peripheral 721 may be included that includes conversion tools. Alternatively, peripheral 722 may be provided that includes conversion tools and communications tools. Peripheral 722 may be useful, for example, for a video game system without communication capabilities. Peripheral 722 may be utilized to allow multiple video game systems to communicate with each other. Conversion tools 722 may allow users to communicate with each other without using a lot of bandwidth. Communication capabilities may include, for example, wireless telephonic capabilities (e.g., CDMA and/or TDMA telephonic capabilities). Peripheral 722 may also include inertial movement sensors and positioning systems (e.g., GPS systems).

Privacy features may also be provided. For example, a user may provide a voice or text message that is to be sent to multiple devices (e.g., wireless telephones). The user sending the message may, for example, always be provided with the right to limit or change the access rights or conversion rights to the message for any particular user.

Figure 8:
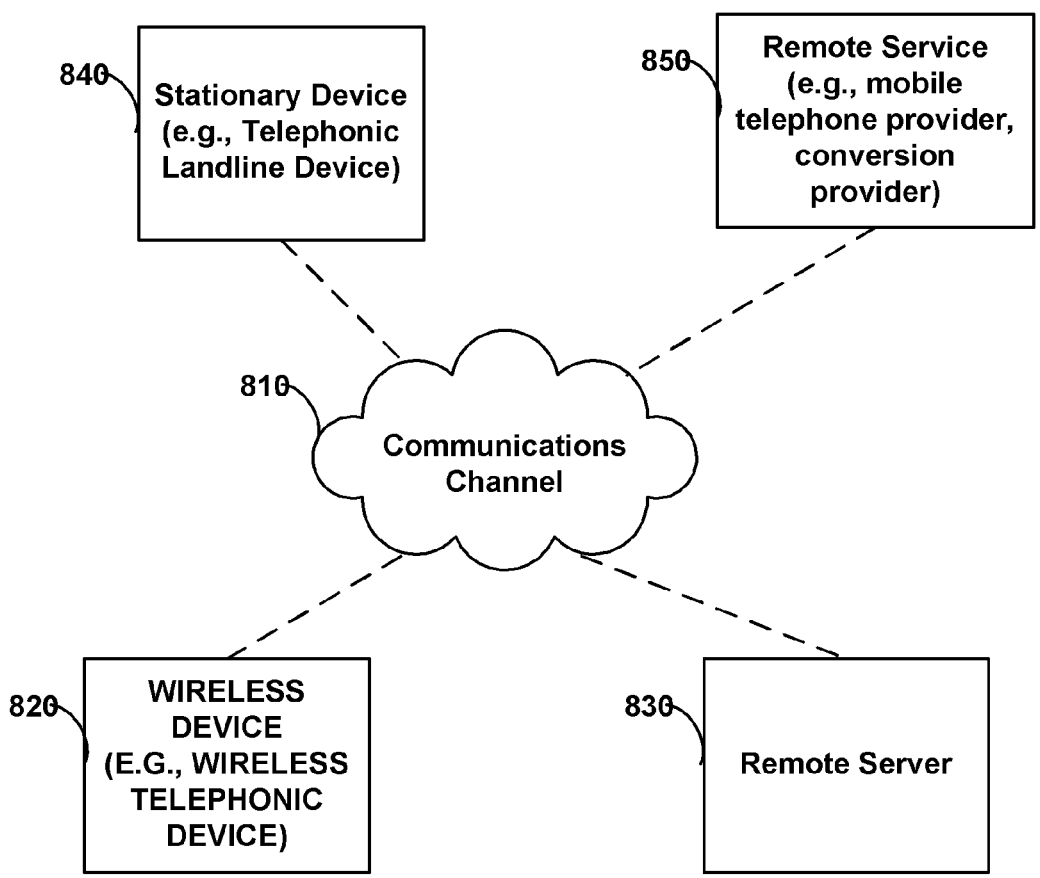
FIG. 8 is an illustration of a network topology constructed in accordance with the principles of the present invention.

FIG. 8 shows topology 800 that includes communications channel 810, stationary device 840, remote service 850, wireless device 820, and remote server 820. Any numbers of remote servers may be, for example, operated by remote service 850 or any device of topology 800. Communications channel 810 may include, for example, any number of internets, intranets, wireless communications channels, wire-based communications channels, radio channels, or any other communication channel.

Persons skilled in the art will also appreciate that the present invention is not limited to only the embodiments described. Instead, the present invention more generally involves providing additional functionality to devices through the use of data type conversion. Persons skilled in the art will also appreciate that the apparatus of the present invention may be implemented in other ways then those described herein. For example, text can be converted into speech and both the text and speech can be utilized to form a video that provides the text in scrolling form where the scrolling is timed to audio data representative of speech of the scrolling text. Similarly, image data can be converted into video data and video data can be utilized to generate still image data for wireless devices such as wireless telephones. All such modifications are within the scope of the present invention, which is limited only by the claims that follow.

What is claimed is:

1. A wireless telephone comprising:
   a memory;
   a receiver for wirelessly receiving audio data representative of speech, wherein said audio data is stored in said memory as a voice message;
   a speech-to-text converter for converting said stored voice message including audio data representative of speech into text data representative of speech, pre-determined criteria are provided that include a plurality of telephone numbers for automatic speech-to-text conversion, said plurality of telephone numbers include a telephone number of a second wireless telephone, and said text data is operable to be auto forwarded to a destination and said destination is an email address; and
   a display for displaying data representative of text.

2. The wireless telephone of claim 1, wherein a manual input option is provided for the conversion of additional received voice messages to text data for a period of time.

3. The wireless telephone of claim 1, wherein a manual input option is provided for the conversion of additional received voice messages for said first wireless device.

4. A network comprising:
   a remote facility for receiving audio data representative of speech for a wireless telephone, wherein said audio data is a voice message, said remote facility converts said audio data into text data, pre-determined criteria are provided that include a plurality of telephone numbers for automatic speech-to-text conversion, said plurality of telephone numbers include a telephone number of a second wireless telephone, and said text data is operable to be auto forwarded to a destination and said destination is an email address.

5. The network of claim 4, wherein a manual input option is provided for the conversion of additional voice messages for said first wireless device to text data for a period of time.

6. The network of claim 4, wherein a manual input option is provided for the conversion additional received voice messages for said first wireless device.

7. The network of claim 4, wherein said audio data is provided by said second wireless telephone.

8. The network of claim 4, wherein said remote system receives a request to convert said voice message.

9. A system comprising:

a remote system operable to receive audio data comprising speech, wherein said audio data is associated with a voice message for a first wireless device, speech-to-text conversion is operable to be performed by said remote system to provide text of said audio data based on pre-determined instructions that include a plurality of telephone numbers for automatic speech-to-text conversion, said plurality of telephone numbers include a telephone number of a second wireless telephone, and said remote system is operable to auto forward said text to a first email address.

10. The method of claim 9, further comprising a manual input option for the conversion of additional voice messages for said first wireless device to text data.

11. The method of claim 9, further comprising a manual input option for the conversion of additional voice messages for said first wireless device to text data for a period of time.

12. The method of claim 9, wherein said voice message was provided by said second wireless telephone.

13. The method of claim 9, further comprising a manual input option for the conversion of additional voice messages for said first wireless device to text data for a period of time.

14. The method of claim 9, wherein said voice message is provided by said second wireless telephone and said remote system receives a request to convert said voice message by said first wireless device.

15. The method claim 9, wherein said voice message is provided by said second wireless telephone, and said instructions are received from said first wireless device.

16. The method of claim 9, wherein said instructions are provided from said first wireless device.

17. A wireless telephone comprising:

a memory;

a receiver for wirelessly receiving audio data representative of a voice message;

a speech-to-text converter for converting said audio data representative of speech into text data representative of speech, wherein pre-determined criteria are provided that include a plurality of telephone numbers for automatic speech-to-text conversion, said plurality of telephone numbers include a telephone number of a second wireless telephone, wherein said audio data is received and converted into said text data and said text data is operable to be auto forwarded to a destination and said destination is an email address; and a display operable to display text.

18. A system comprising:

a remote system for receiving audio data comprising speech associated with a first wireless telephone, wherein said audio data is associated with a voice message for said first wireless telephone from a second wireless telephone, instructions are received by said remote system from said first wireless telephone associated with said audio data, wherein said instructions include a plurality of telephone numbers for automatic speech-to-text conversion, said plurality of telephone numbers include a telephone number of said second wireless telephone, speech-to-text conversion is performed by said remote system to provide text data of said audio data based on said instructions, and said text data is auto forwarded to a destination based on said instructions and said destination is an email address.

19. The system of claim 18, wherein a manual input option is provided for the conversion of additional voice messages for said first wireless device to text data for a period of time.

20. The system of claim 18, wherein a manual input option is provided for the conversion of additional received voice messages for said first wireless device.

* * * * *